US010042940B2

(12) United States Patent
Agarwal et al.

(10) Patent No.: US 10,042,940 B2
(45) Date of Patent: Aug. 7, 2018

(54) ENHANCING RANKINGS OF SEARCH RESULTS FOR MEMBER PROFILE QUERIES

(71) Applicant: Microsoft Technology Licensing, LLC, Redmond, WA (US)

(72) Inventors: Rahul Agarwal, Sunnyvale, CA (US); Senthil Sundaram, South San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 428 days.

(21) Appl. No.: 14/579,772

(22) Filed: Dec. 22, 2014

(65) Prior Publication Data

US 2016/0063121 A1    Mar. 3, 2016

Related U.S. Application Data

(60) Provisional application No. 62/044,138, filed on Aug. 29, 2014.

(51) Int. Cl.
*G06F 17/30* (2006.01)
*G06Q 10/00* (2012.01)

(52) U.S. Cl.
CPC .... *G06F 17/30867* (2013.01); *G06F 17/3053* (2013.01); *G06Q 10/00* (2013.01)

(58) Field of Classification Search
USPC ....................................... 707/706, 723, 732
See application file for complete search history.

(56) References Cited

U.S. PATENT DOCUMENTS 8,086,624 B1     12/2011  Hubinette
8,442,978 B2 *    5/2013  Berkhim ........... G06F 17/30616
                                                                707/732

(Continued)

FOREIGN PATENT DOCUMENTS

CN        107155362 A     9/2017
IN     201717010049 A     9/2017

(Continued)

OTHER PUBLICATIONS

"International Application Serial No. PCT/US2015/022572, International Search Report dated Jun. 12, 2015", 3 pgs.

(Continued)

*Primary Examiner* — Cam-Linh Nguyen
(74) *Attorney, Agent, or Firm* — Schwegman Lundberg & Woessner, P.A.

(57) ABSTRACT

Techniques for improving rankings of search results generated by a search engine are described. A set of member profiles is identified. The identifying is based on keywords specified in a search query matching search index entries corresponding to the set of member profiles. A subset of the member profiles is selected. The selecting is based on a matching of the keywords to special index entries associated with the subset of the member profiles. The special index entries represent values of data fields specified in each of the subset of the set of member profiles. The special index entries also represent relationships between the values of the data fields. Ranking scores associated with each of the subset of the member profiles are boosted. A portion of each of the set of member profiles is communicated for presentation in user interface in order of the ranking scores.

20 Claims, 11 Drawing Sheets

(56) References Cited

U.S. PATENT DOCUMENTS

| | | | |
|---|---|---|---|
| 2008/0005073 A1* | 1/2008 | Meek | G06F 17/30867 |
| 2009/0063265 A1 | 3/2009 | Nomula | |
| 2009/0187537 A1* | 7/2009 | Yachin | G06F 17/30864 |
| 2009/0282022 A1* | 11/2009 | Bennett | G06F 17/30675 |
| 2010/0306249 A1* | 12/2010 | Hill | G06F 17/30867 |
| | | | 707/769 |
| 2011/0106850 A1* | 5/2011 | Li | G06F 17/30699 |
| | | | 707/780 |
| 2011/0196855 A1* | 8/2011 | Wable | G06F 17/30631 |
| | | | 707/711 |
| 2012/0158713 A1* | 6/2012 | Jin | G06F 17/30029 |
| | | | 707/728 |
| 2012/0158720 A1* | 6/2012 | Luan | G06F 17/30867 |
| | | | 707/732 |
| 2012/0185486 A1* | 7/2012 | Voigt | H04L 51/32 |
| | | | 707/741 |
| 2013/0073546 A1* | 3/2013 | Yan | G06F 17/30867 |
| | | | 707/732 |
| 2013/0124542 A1* | 5/2013 | Lee | G06F 17/30392 |
| | | | 707/751 |
| 2013/0332438 A1* | 12/2013 | Li | G06F 17/30867 |
| | | | 707/706 |
| 2014/0129552 A1* | 5/2014 | Sinha | G06Q 50/01 |
| | | | 707/724 |
| 2014/0244530 A1 | 8/2014 | Baldwin et al. | |
| 2014/0250101 A1* | 9/2014 | Wable | G06F 17/30631 |
| | | | 707/711 |
| 2015/0286643 A1* | 10/2015 | Kumar | G06F 17/30672 |
| | | | 707/728 |
| 2016/0034461 A1* | 2/2016 | Sundaram | G06F 17/30522 |
| | | | 707/728 |
| 2016/0034583 A1* | 2/2016 | Agarwal | G06F 17/3053 |
| | | | 707/706 |
| 2016/0063093 A1* | 3/2016 | Boucher | G06F 17/3064 |
| | | | 707/748 |
| 2016/0063115 A1* | 3/2016 | Ayan | G06F 17/30867 |
| | | | 707/722 |

FOREIGN PATENT DOCUMENTS

| | | |
|---|---|---|
| WO | WO-2013063327 A1 | 5/2013 |
| WO | WO 2016032572 A1 | 3/2016 |

OTHER PUBLICATIONS

"International Application Serial No. PCT/US2015/022572, Written Opinion dated Jun. 12, 2015", 7 pgs.

"Search Engine Indexing", Wikipedia, [Online]. Retrieved from the Internet: <URL: http://en.wikipedia.org/wiki/Search_engine_indexing>, (Accessed Aug. 28, 2014), 13 pgs.

"International Application Serial No. PCT/US2015/022572, International Preliminary Report on Patentability dated Nov. 3, 2016", 9 pgs.

"International Application Serial No. PCT/US2015/022572, Response filed Jun. 29, 2016 to Written Opinion dated Jun. 12, 2015", 4 pgs.

"International Application Serial No. PCT/US2015/022572, Written Opinion dated Aug. 12, 2016", 8 pgs.

* cited by examiner

FIG. 9

ENHANCING RANKINGS OF SEARCH RESULTS FOR MEMBER PROFILE QUERIES

CROSS-REFERENCE TO RELATED APPLICATIONS

The present application claims the benefit of priority to U.S. Provisional Patent Application Ser. No. 62/044,138, filed Aug. 29, 2014, which is incorporated herein by reference in its entirety.

TECHNICAL FIELD

The present disclosure generally relates to information retrieval, search engines, query processing, post-processing of search results, ranking of search results, fuzzy search and comparisons, and visually representing search results. In one specific embodiment, the present disclosure relates to boosting ranking scores of a subset of profiles of members of a social network system that satisfy a search query based on relationships between data items specified in the search query and data items specified in the subset of profiles.

BACKGROUND

Online social network services provide users with a mechanism for defining, and memorializing in a digital format, their relationships with other people and other entities (e.g., companies, schools, etc.). This digital representation of real-world relationships and associations is frequently referred to as a social graph. There are a variety of web-based applications and services that implement and maintain their own social graph, and still more applications and/or services that leverage the social graph of a third-party social network service (e.g., via publically available application programming interfaces, or APIs). The number and variety of applications and services that leverage a social graph maintained by a social network service is seemingly endless. For instance, a variety of messaging and content sharing applications leverage a social graph to establish user privileges for sharing content with, or accessing the content of, others.

In addition to maintaining a social graph, many social network services maintain a variety of personal information about their members. For instance, with many social network services, when a user registers to become a member and/or at various times subsequent to registering, the member is prompted to provide a variety of personal or biographical information, which may be displayed in a member's personal web page. Such information is commonly referred to as personal profile information, or simply "profile information," and when shown collectively, it is commonly referred to as a member's profile. For instance, with some of the many social network services in use today, the personal information that is commonly requested and displayed as part of a member's profile includes a person's age, birthdate, gender, interests, contact information, residential address, home town and/or state, the name of the person's spouse and/or family members, and so forth. With certain social network services, such as some business or professional network services, a member's personal information may include information commonly included in a professional resume or curriculum vitae, such as information about a person's education, the schools, colleges or universities that the member attended, the company at which a person is employed, an industry in which a person is employed, a job title or function, an employment history, skills possessed by a person, professional organizations of which a person is a member, and so on.

Because social network services are a rich source of information about people and their relationships with other people, social network services are an extremely useful tool for performing certain tasks. For example, just as a telephone directory, phone book, or white pages previously served as the go-to source for basic information about people, contemporary social network services serve as a far richer directory of people. Many people use social network services to search for member profiles of friends, colleagues, classmates, and other people they may know, or want to know. Accordingly, many social network services provide a search engine to facilitate searching for the member profiles of members of the social network service. However, because social network services have so many members, finding one or more of the best search results corresponding to a search query is often difficult.

DESCRIPTION OF THE DRAWINGS

Some embodiments are illustrated by way of example and not limitation in the FIG.s of the accompanying drawings, in which:

FIG. 7 is a screenshot of an example user interface in which search results corresponding to a search query are presented;

FIG. 8 is a screenshot of an example user interface in which additional search results are presented;

FIG. 9 is a screenshot of an example user interface in which the search results of FIG. 8 have been re-ranked;

DETAILED DESCRIPTION

Figure 1:
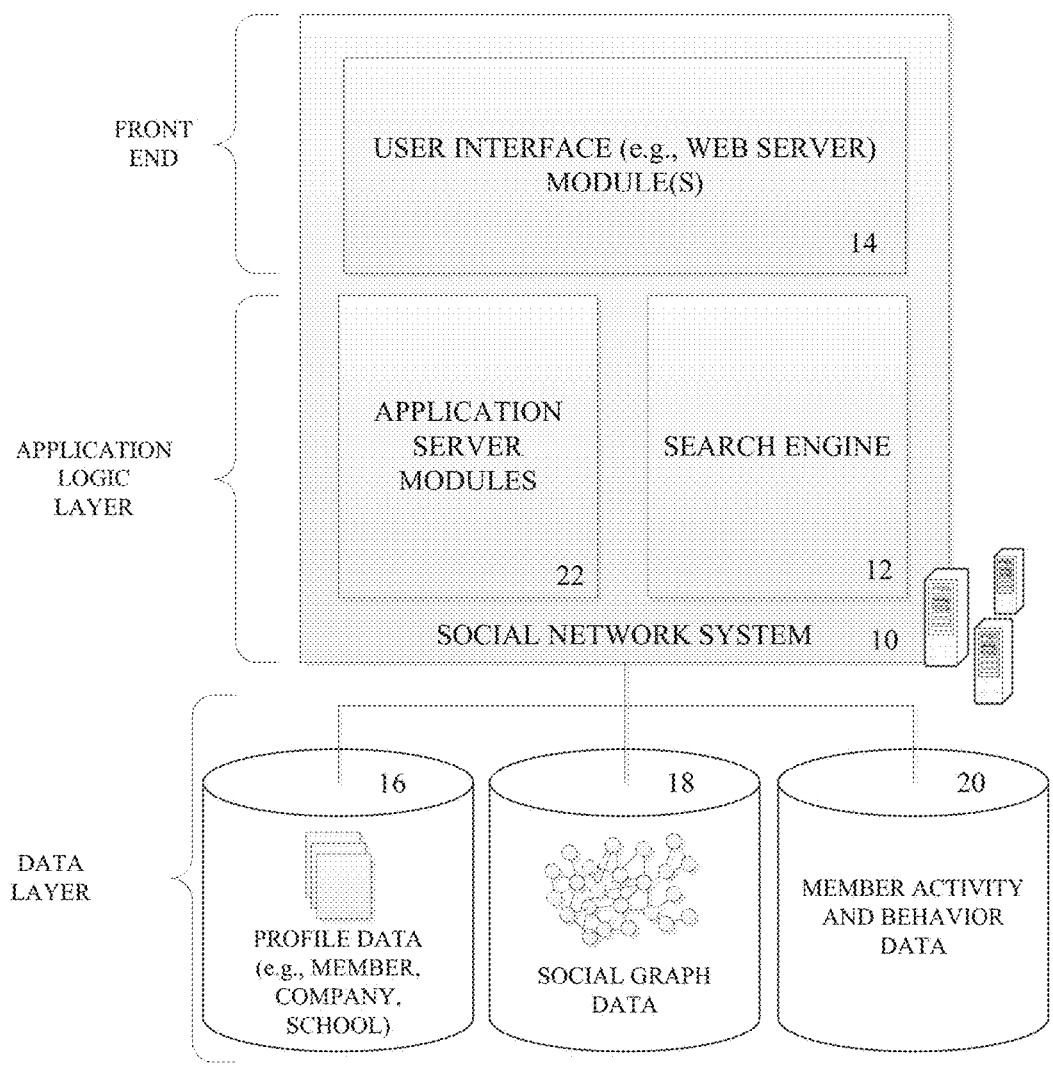
FIG. 1 is a block diagram of the functional modules or components that comprise a computer-network based social network service, including a search engine consistent with some embodiments of the invention.

The present disclosure describes methods, systems and computer program products for improving the rankings of search results corresponding to a search query. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

When processing a search query, a search engine may compare keywords included in a search query to keywords in a search index corresponding to documents in a corpus. Thus, in various embodiments, by using a search index, a search engine may not need to scan every document in the corpus to find documents matching a search query. Instead the search engine merely identifies documents satisfying a search query by comparing the search query to the search index. In various embodiments, the benefits of faster retrieval of search results must be weighed against the costs of maintaining the search index, including extra storage space, processing power, and so on. Additionally, in various embodiments, the benefits must be weighed against any loss of usefulness or accuracy that may result from the search query being compared with a subset of the documents (e.g., the search index) instead of the documents themselves.

An example of a search index is an inverted index. An inverted index includes a list of words and a list of documents in the corpus that contain each of the words (e.g., stored in a hash table, distributed hash table, binary tree, or other data structure). In various embodiments, the index may include information pertaining to a frequency of each word in each document (e.g., to enable the search engine to rank documents satisfying the query) or the positions of each word in each document (e.g., to enable the search engine to support phrase searching).

Another example of a search index is a forward index. A forward index may include a list of documents in the corpus and a list of words corresponding to each document in the corpus (e.g., stored in a hash table, distributed hash table, binary tree, or other data structure). When a new document is added to the corpus, it may be immediately added to the forward index. Later (e.g., during asynchronous system processing), the forward index may be converted into an inverted index. Thus, the use of the forward index may prevent any bottleneck that may result from documents having to be immediately converted to an inverted index.

In various embodiments, the documents in a corpus may correspond to member profiles of members of a social network system. Each of these member profiles may include one or more values corresponding to one or more data fields associated with the member profile. For example, a member profile may include a data field for a current job title of the member and a data field for a current employer of the member. Additionally, the member profile may include additional data fields for previous job titles of the member and previous employers of the member.

In various embodiments, each of the member profiles in the corpus is analyzed to identify a relationship between a first value included in the profile and a second value included in the profile. The identification of the relationship may be based on a determination that the first value corresponds to a first data field of the member profile and the second value corresponds to a second data field of the member profile. Based on the identifying of the relationship, a special search index entry corresponding to the member profile is generated. The special search index entry represents the first value, the second value, and the relationship between the first value and the second value. The special search index entry is included in the search index for use by the search engine in boosting a ranking the member profile in a set of results satisfying a search query.

In various embodiments, a search query submitted by a searcher is received. It is determined that the search query includes a first value and a second value. A relationship between the first value and the second value is determined. For example, it is determined that the first value corresponds to a first data field of a member profile and the second value corresponds to a second data field of the member profile. A set of member profiles that satisfy the search query is identified based on a matching of keywords specified in the search query and keywords specified in a search index. A subset of the set of member profiles is selected based on a matching of the first value and the second value with a special search index entry that includes a representation of a relationship between the first value and the second value. Ranking scores for each of the selected subset of the set of member profiles are boosted. The set of member profiles is communicated for presentation in a user interface in order of their ranking scores.

In various embodiments, techniques for improving rankings of search results generated by a search engine are described. A set of member profiles is identified. The identifying is based on keywords specified in a search query matching search index entries corresponding to the set of member profiles. A subset of the member profiles is selected. The selecting is based on a matching of the keywords to special index entries associated with the subset of the member profiles. The special index entries represent values of data fields specified in each of the subset of the set of member profiles. The special index entries also represent relationships between the values of the data fields. For example, the special index entries may each be created as Cartesian products of values in the data fields. Ranking scores associated with each of the subset of the member profiles are boosted. A portion of each of the set of member profiles is communicated for presentation in user interface in order of the ranking scores.

Other advantages and aspects of the present inventive subject matter will be readily apparent from the description of the figures that follows.

FIG. 1 is a block diagram of the functional modules or components that comprise a computer- or network-based social network service 10, including a search engine 12 consistent with some embodiments of the invention. As shown in FIG. 1, the social network system 10 is generally based on a three-tiered architecture, comprising a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social network system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end consists of a user interface module (e.g., a web server) 14, which receives requests from various client-computing devices, and communicates appropriate responses to the requesting client devices. For example, the user interface module(s) 14 may receive requests in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 1, the data layer includes several databases, including one or more databases 16 for storing data relating to various entities represented in a social graph. With some embodiments, these entities include members, companies, and/or educational institutions, among possible others. Consistent with some embodiments, when a person initially registers to become a member of the social network service, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's member profile, for example, in the database with reference number 16. With some embodiments, a member's profile data will include not only the explicitly provided data, but also any number of derived or computed member profile attributes and/or characteristics.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data maintained in a database 18. With some embodiments a social graph data structure may be implemented with a graph database 18, which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph, and as such, various other databases may be used to store data corresponding with other entities. For example, although not shown in FIG. 1, consistent with some embodiments, the system may include additional databases for storing information relating to a wide variety of entities, such as information concerning various online or offline groups, job listings or postings, photographs, audio or video files, and so forth.

With some embodiments, the social network service may include one or more activity and/or event tracking modules, which generally detect various user-related activities and/or events, and then store information relating to those activities/events in the database with reference number 20. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

The application logic layer includes various application server modules 22, which, in conjunction with the user interface module(s) 14, generates various user interfaces (e.g., web pages) with data retrieved from various data sources in the data layer. With some embodiments, individual application server modules 22 are used to implement the functionality associated with various applications, services and features of the social network service. For instance, a messaging application, such as an email application, an instant messaging application, or some hybrid or variation of the two, may be implemented with one or more application server modules 22. Of course, other applications or services may be separately embodied in their own application server modules 22.

The social network service may provide a broad range of applications and services that allow members the opportunity to share and receive information, often customized to the interests of the member. For example, with some embodiments, the social network service may include a photo sharing application that allows members to upload and share photos with other members. As such, at least with some embodiments, a photograph may be a property or entity included within a social graph. With some embodiments, members of a social network service may be able to self-organize into groups, or interest groups, organized around a subject matter or topic of interest. Accordingly, the data for a group may be stored in a database (not shown). When a member joins a group, his or her membership in the group will be reflected in the social graph data stored in the database with reference number 18. With some embodiments, members may subscribe to or join groups affiliated with one or more companies. For instance, with some embodiments, members of the social network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modelled with the social graph data of the database with reference number 18.

In addition to the various application server modules 22, the application logic layer includes a search engine 12. As illustrated in FIG. 1, with some embodiments the search engine 12 is implemented as a service that operates in conjunction with various application server modules 22. For instance, any number of individual application server modules 22 can invoke the functionality of the search engine 12. However, with various alternative embodiments, the search engine 12 may be implemented as its own application server module such that it operates as a stand-alone application. With some embodiments, the search engine 12 may include or have an associated publicly available application programming interface (API) that enables third-party applications to invoke the functionality of the search engine 12. With some embodiments, the search engine 12 may be a people-search engine, and provide functionality to search for people (e.g., member profiles) specifically. Alternatively, the search engine module 12 may facilitate searching for any type of information entity (e.g., people or member profiles, companies, schools and other educational institutions, etc.) that is maintained and used by the various applications of the social network system, such as companies, groups, job listings, etc. With such an embodiment, the user performing the search may specify the type of entity to be searched for. Alternatively, the search engine may algorithmically identify the type of search being performed, for example, based on the search query.

As described in greater detail below, in general, the search engine 12 uses a ranking algorithm that boost or increases the ranking scores assigned to certain of the member profiles satisfying the search query based on various criteria. Such criteria may include a determination that the profiles share one or more particular attributes or characteristics in common with the member profile of the member performing the search. For example, with some embodiments, the ranking algorithm will increase the ranking score assigned to those member profiles satisfying the search query and having a profile attribute indicating the member is employed at the same company as the member performing the search. Accordingly, if the member profile of the member performing the search indicates that the member is currently employed at ACME Products, any member profile that satisfies the search query and also indicates that the member is employed at the same company—that is, ACME Products—will have its ranking score adjusted upward or otherwise calculated or derived to reflect this shared member profile attribute. Accordingly, with all else equal, if two member profiles for two different persons with the same name, (e.g., John Doe) differ in that one of the members is employed at the same company as the member performing the search, and the other member is employed at some other company, the member profile of the member employed at the same company as the searching member will be assigned the higher ranking score, and thus be presented more prominently in a list of search results.

As another example, the ranking algorithm may boost ranking scores assigned to certain of the member profiles based on a determination that keywords specified in the search query correspond to values of data fields having a relationship that is relevant to a context of the search. For example, based on a determination that a context of the search is that the searcher is a recruiter seeking to fill a vice president position at a software company and a determination the search query submitted by the searcher includes the keywords "vp engineering" and "apple," the ranking algorithm may infer that the searcher is interested in identifying member profiles specifying "vice president" as a current job title and "apple" as a current employer. Based on this determination, the ranking algorithm may boost the ranking scores of member profiles matching the inferred search query, as is described in more detail below.

Figure 2:
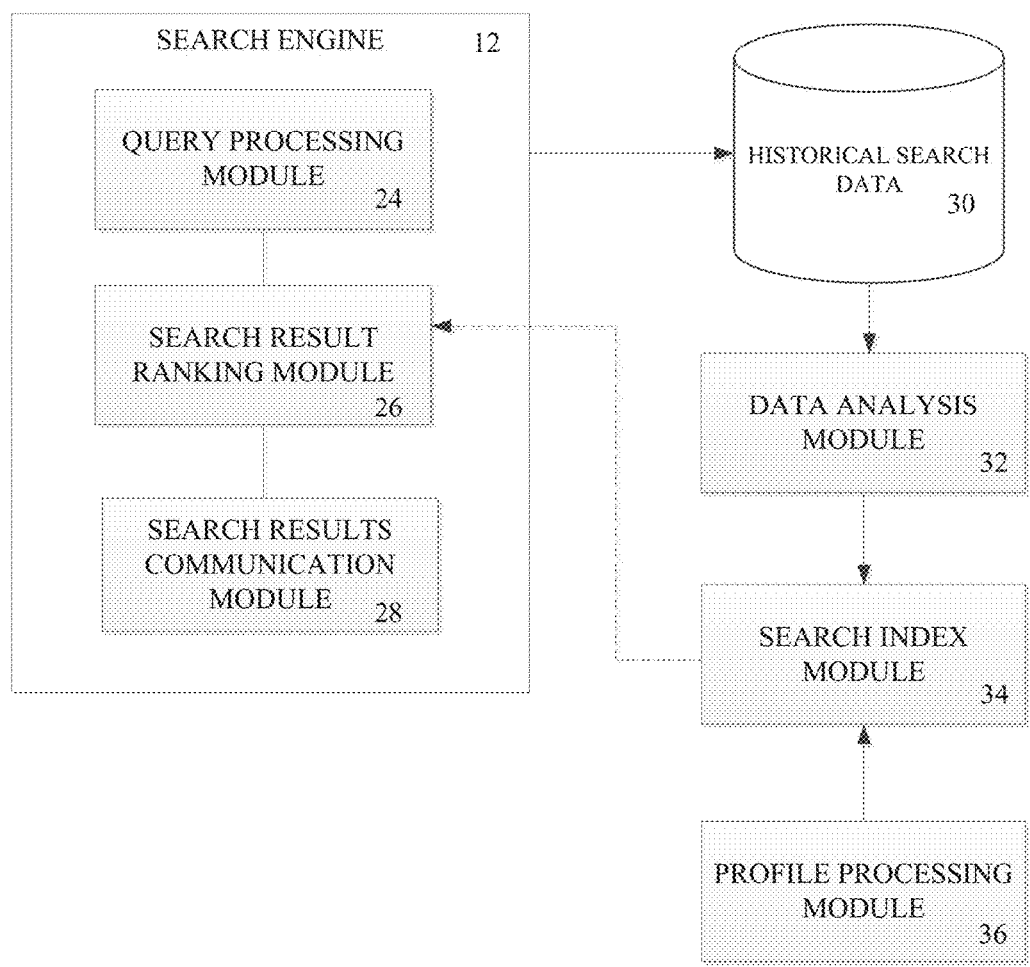
FIG. 2 is a functional block diagram of a search engine, consistent with some embodiments of the invention.

FIG. 2 is a functional block diagram of a search engine, consistent with embodiments of the invention. As illustrated in FIG. 2, the search engine 12 includes a query processing module 24, a search results ranking module 26 and a search results presentation module 28. In general, the query processing module 24 receives a search query and then processes the search query by selecting or otherwise identifying data in a database (e.g., in a search index) that satisfies the search query. Depending upon the nature of the search query, one of several matching rules may be evaluated to identify the member profiles that match the query. For example, if the search query is a first and last name, the search query is processed by selecting the relevant records from a database having names in the appropriate database field that match, exactly or partially, the name specified in the search query. If the search query specifies some other member profile attribute, in addition to or instead of a first and/or last name, a particular matching rule for that member profile attribute may be evaluated to identify member profiles that satisfy the query. For instance, the search query may be a first and/or last name. Alternatively, in some instances, the search may specify one or more other member profile attributes, to the exclusion, or in addition to, a name. For instance, a search query may include any combination of the following member profile attributes: name (first and/or last); geographical information, including country, state, city, postal code, including proximity to any of the aforementioned; job title; company of current or previous employment; school attended; industry of employment; groups of which one is a member; languages spoken; job function; company size; skills possessed; relationship to person initiation the search (e.g., first degree connection, second degree, and so forth); interests; experience or seniority level; as well as many others. The query processing module 24, using the received search query, identifies a set of member profiles satisfying the search query.

The search results ranking module 26 derives for each search result (e.g., member profile) a ranking score representing a measure of relevance, particularly, in view of both the search query and the particular member who has invoked or initiated the search. With some embodiments, the ranking algorithm may utilize any number of input signals for use in deriving a ranking score, where one or more signals are combined in some way (e.g., multiplied or added together) to derive an overall ranking score. Consistent with embodiments of the invention, at least one of those input signals or component scores represents the extent to which certain member profile attributes are shared in common between a member profile in the search results and the member profile of the member who has initiated or invoked the search. Accordingly, when the query processing module identifies or selects the database records representing the member profiles that satisfy the search query, certain member profile attributes may also be retrieved for the purpose of comparing those member profile attributes with the corresponding member profile attributes of the member who has initiated or invoked the search. Depending upon the particular member profile attributes in consideration, a particular matching rule may be evaluated to determine the extent to which two members have similarity with respect to the particular member profile attribute.

With some embodiments, the ranking module 26 may have multiple ranking algorithms for use in generating ranking scores. Accordingly, a particular ranking algorithm may be selected and used depending upon the type of search query that has been received, or the specific member profile attributes that have been specified as part of the search query.

For instance, if the search query is determined to be a simple name search (e.g., first and/or last name), a particular ranking algorithm for use with that type of search query might be selected and used to derive and assign ranking scores to the search results. However, if the search query specifies a particular member profile attribute, then a different ranking algorithm may be selected and used in deriving and assigning ranking scores. For example, if the search query includes a job title and a name of an employer, a particular ranking algorithm may be selected and used to boost the ranking scores for member profiles specifying the job title as a current job title and the name of the employer as a current employer.

In general, a ranking algorithm used by the ranking module may include any number of weighting factors, which may vary depending upon the search query type, and the specific member profile attribute types that have been specified as part of the search query. The following example is illustrative.

Presume for sake of an example that a member of the social network service residing in Detroit, Mich. desires to reach out and make contact with a former college classmate known to now reside in Seattle, Wash. The searching member generates a search query specifying both the first and last name of the college classmate and specifies as a search parameter the location, "Seattle, Wash." Because the search query specifically indicates a geographical location that is different from the searcher's geographical location, the ranking algorithm selected for use in deriving ranking scores for the search results should not promote or otherwise boost the relevance scores assigned to member profiles as a result of those member profiles indicating that a member lives in the same location (i.e., Detroit, Mich.) as the member performing the search. Furthermore, presume for a moment that the member residing in Detroit attended college in Seattle, Wash. Because the query has specified the geographical location, Seattle, Wash., and because the searching member attended college in Seattle, Wash., those member profiles matching the query and specifying attendance or graduation from the same college as the searching member may be boosted in the search results ranking. For instance, the ranking module may weight more heavily any member profile in which the member has indicated attendance at, or graduation from, the same university as the searching member. In essence, by specifying a particular member profile attribute (in this example, a geographical location), another member profile attribute (e.g., college/university attended) is weighted more heavily in the ranking algorithm to reflect the presumed importance of a member profile that has as an attribute a college or university that is the same as the member performing the search.

As another example, consider that a member of a social network system is determined to be a salesperson employed by a particular employer to sell a particular type of product. In various embodiments, this information may be derived from data items specified in the searching member's profile, an analysis of the searching member's behaviour, or an analysis of data pertaining to connections of the searching member. The searching member submits a search query specifying the keywords "sales" and "general electric." Based on the information known about the searching member and the keywords submitted by the searching member in the search query, it may be inferred that the searching member is seeking individuals who are currently employed by General Electric in a sales capacity. Or it may be inferred that the member is seeking individuals who are currently employed or were previously employed by General Electric and who are familiar with the type of product that the salesperson is selling. Or it may be inferred that the member is seeking individuals who are currently employed by General Electric and who are responsible for making purchasing decisions on behalf of General Electric with regard to the type of the product. In various embodiments, based on the context of the search and the inferences made based on the context, the search engine may be configured to boost rankings of some of the member profiles satisfying the search query. This subset of the member profiles may be selected based on the search index including special search index entries representing that the member profile specifies a strong correlation between General Electric and the sales role (e.g., that the person is currently employed at General Electric in a sales role), or a strong correlation between General Electric and the type of the product (e.g., that the person is currently employed at General electric and responsible for purchasing decision regarding the type of the product), or a combination of such correlations, as described in more detail below.

The search results presentation module 28 causes the search results to be presented, arranged in order of their assigned ranking score, in a user interface. For instance, the user interface may be a search results page providing a simple list of at least a portion of the member profiles that satisfied the query. Alternatively, in some instances, the user interface may operate in conjunction with the query processing module 24 and the search results ranking module 26 to implement an incremental search technique whereby search results are presented while a member is typing in the search query. Such results may be presented, for example, in a drop down suggestion list, or directly in a portion of a search results web page.

As illustrated in FIG. 2, with some embodiments, for each search query that is processed by the search engine, the search engine 12 will store resulting data—in particular, the search results that resulted from a particular search query, and any user-selections in a database 30. Once a sufficiently large data set for a particular period of time has been established, a data analysis module 32 is then used to identify the specific member profiles ultimately selected from a search results set and the member profile of the member who has invoked a particular search. In this manner, the accuracy of the search results with respect to particular search contexts can be determined and can be used in a ranking algorithm by the search results ranking module 26.

With some embodiments, the ranking algorithm may be implemented to weight the various member profile attributes used in the ranking algorithm based on the level of correlation as determined by the data analysis module 32. For example, if the data shows that a searching member of a particular type (e.g., a job seeker, a recruiter, or a salesperson) who submits a search query including keywords corresponding to a job title and employer selects a member profile specifying the employer as a current employer and the job title as a current job title, a particular percentage (e.g., seventy-five percent) of the time, and a second member profile specifying the employer as a past employer and the job title as a job title corresponding to the past employer some percentage of time lower than seventy-five, this information may be used to weight the significance of the relationship between the various member profile attributes in terms of a contribution to the overall ranking score. In any case, the data analysis module 32 is used to analyze historical search data 30 for the purpose of identifying relationships between member profile attributes that are the most significant in particular search contexts.

In various embodiments, upon discovery of relationships between member profile attributes having particular significance to particular search queries having particular search contexts, the search index module 34 may generate special search index entries corresponding to the member profiles. For example, based on a determination that current job title and the current employer of the member profile has special significance to particular types of searchers (e.g., job recruiters, salespeople, or both) who enter queries identifying a job title and current employer, the search index module 32 may generate a special search index entry for the member profiles that specifies and represents the relationship, as described in more detail below.

Figure 3:
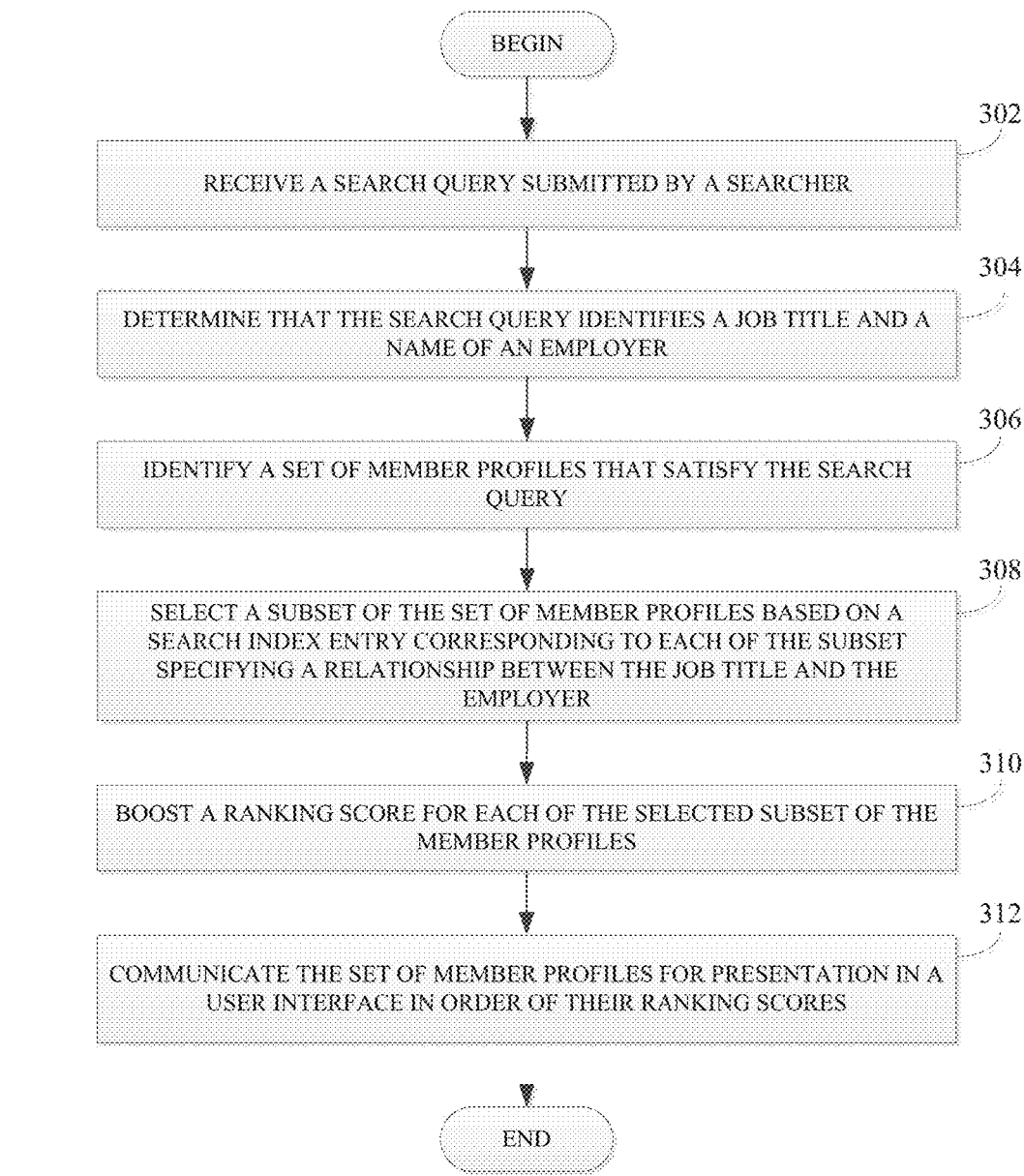
FIG. 3 is a flow diagram illustrating an example method of boosting ranking scores for member profiles based on various criteria.

FIG. 3 is a flow diagram illustrating an example method 300 of boosting ranking scores for member profiles based on various criteria. In various embodiments, the method 300 is implemented by one or more of the modules of FIG. 2. At operation 302, the query processing module 24 receives a search query submitted by a searcher.

At operation 304, the query processing module 24 determines that the search query identifies a job title and a name of an employer. For example, the query processing module 24 compares combinations of keywords and keyword phrases to lists of known job titles and names of employers. In various embodiments, the query processing module 24 also performs a translation of the keywords and keyword phrases. The translation may include matching abbreviations of job titles to known job titles and abbreviations of names of employers to known names of employers. For example, the keyword "VP" may be translated into "vice president" or vice versa. Similarly, the keyword "sr" may be translated into "senior." In various embodiments, the mappings of abbreviations to known job titles and names of employers may be determined through the discovery process discussed above in which the historical search data 30 is analyzed.

At operation 306, the query processing module 24 identifies a set of member profiles that satisfy the search query. For example, the query processing module 24 compares keywords specified in the search query with an inverted search index. Based on a matching of one or more keywords specified in the query to keywords in the inverted search index, the query processing module 24 identifies a set of member profiles that match the search query.

At operation 308, the query processing module 24 selects a subset of the set of member profiles for boosting in the rankings of the set of member profiles. For example, the query processing module 24 identifies a context of the search based on, for example, information specified in a profile of the searcher (e.g., whether the searcher is a job seeker, recruiter, or salesperson), information pertaining to a reason why the searcher is performing the search (e.g., whether the searcher is trying to identify members the searcher may know, identify connections of the searcher who may be able to introduce the searcher to another member, identify potential candidates for a job opening, identify contacts within an organization who can serve as sales contacts for the searcher, and so on). The identification of the context may be based on behaviour of the searcher, other searchers having member profiles that are similar to the searcher, or connections of the searcher (e.g., as derived from the profile data 16, social graph data 18, and member activity and behaviour data 20). The identification of the context may also be based on analysis of the historical search data 30, as described above with respect to FIG. 2.

Based on the context of the search, the query processing module 24 may infer relationships between combinations of keywords and keyword phrases specified in the query. For example, based on a the determination that search query includes the job title and the name of the employer and based on a determination that the searcher is a sales person seeking to identify sales contacts within an organization, the query processing module 24 may determine that the searcher is not simply trying to find member profiles in which a member has at one point worked in a position having the job title and at another point worked in a different position with the specified employer, but that the searcher is seeking to find member profiles specifying the job title as a current job title and the employer as the current employer. Thus, the subset of the member profiles satisfying the query based on keywords may be selected based on the member profiles specifying the job title as a current job title and the employer as the current employer. The determination of whether each of the subset of the member profiles specifies the job title as the current job title and the employer as the current employer may be based on a mapping of the translated job title and employer name to a special search index entry that identifies member profiles having the specified relationship between the job title and employer. This special search index entry may be generated as described below with respect to FIG. 4.

At operation 310, the search result ranking module 26 may boost the ranking scores associated with the selected subset of the set of member profiles. Thus, for example, member profiles that specify the job title as a current job title and the employer as the current employer may be elevated in the rankings above member profiles that simply specify the job title and the employer as keywords in an inverted search index without an indication of the strength of the correspondence between the job title and the employer as specified in the profile. Thus, for example, a member profile specifying the job title as a current job title and the employer as a current employer may be elevated above member profiles specifying the job title as a previous (non-current) employer, the employer as a previous (non-current) employer, or both. Additionally, a member profile specifying that a member held the job title at the employer previously may be elevated above a member profile that specifies that the member held the specified job title at a different employer or a different job title and the specified employer. As another example, consider a member having a profile specifying that the member was a Chief Technology Office (CTO) at ABC Company and also an Engineer at LimkedIn Corporation. This member may not have an index entry that specified "linkedin:CTO" because that member did not specify that he was a CTO LinkedIn. Thus, when another member is determined to be searching for LinkedIn CTO, the member having specified CTO at ABC and Engineer at LinkedIn will not receive a boost in the search results over other member profiles that specify that the member is or was a CTO at LinkedIn.

At operation 312, the set of member profiles is communicated for presentation in a user interface according to the ranking scores associated with each of the member profiles. Thus, member profiles associated with boosted ranking scores may be presented in a more prominent position in the user interface than other member profiles satisfying the search query.

Figure 4:
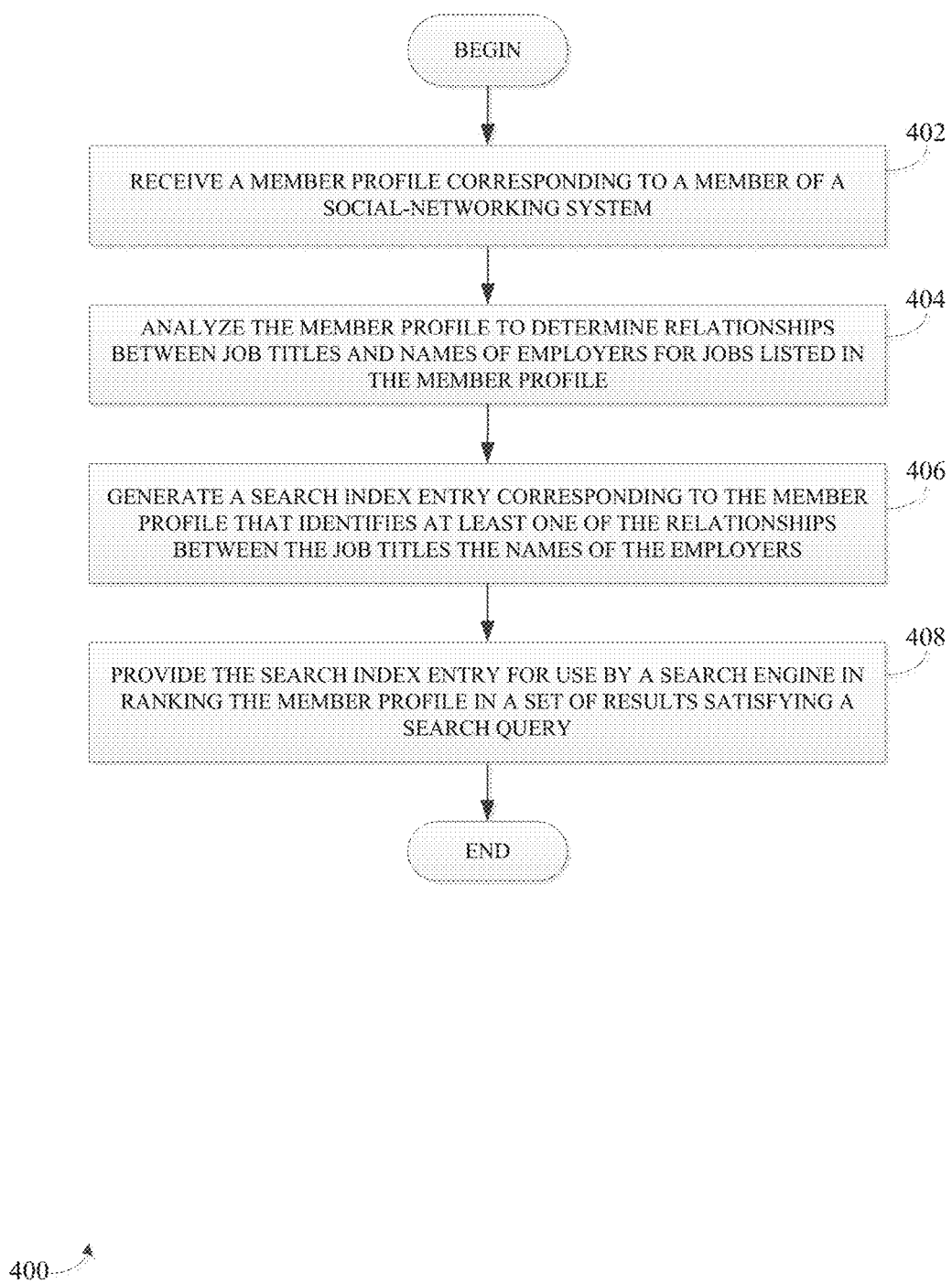
FIG. 4 is a flow diagram illustrating an example method of generating a special search index entry for a member profile that identifies a strength of a relationship between job title and an employer specified in the member profile.

FIG. 4 is a flow diagram illustrating an example method 400 of generating a special search index entry for a member profile that identifies a strength or type of a relationship between job title and an employer specified in the member profile. In various embodiments, the method 400 is implemented by one or more of the modules of FIG. 2. At operation 402, the profile processing module 36 receives a member profile corresponding to a member of a social-networking system. For example, the profile processing module 36 receives a submission of the member profile from the member.

At operation 404, the profile processing module 36 analyzes the member profile to determine relationships between job titles and names of employers specified in the member profile (e.g., by parsing a work history specified in the member profile). For example, the profile processing module 36 determines a job title that the member held while employed with each employer specified in the work history of the member profile.

At operation 406, the search index module 34 generates a special search index entry corresponding to at least one of the determined relationships between the job titles and employers. For example, the search index module 34 may generate a special search index entry representing a job title and an employer that is identified in the member profile as being a current job title and a current employer. The search index entry may have a syntax or form that is recognizable as representing values for specific data fields associated with the member profile as well as the relationship between those fields. For example, the search index entry may be specified as "{<job_title_code>:<employer_code>}." In this example, the special enclosure characters (e.g., brackets) designate the portion of the search index entry included within the brackets includes special codes pertaining to a relationship between the job title and the employer (e.g., that the search index entry is not simply contain a keyword). In various embodiments, the search index entry may include a Cartesian product of values of data fields. Additionally, in this example, the special separator character within the search index entry (e.g., the colon) may indicate a type or a strength of relationship between the job title and employer (e.g., that the job title is specified as a current job and the employer is specified as the current employer in the associated member profile). Other special enclosure and separator characters may be used to indicate that the search index entry represents values pertaining to different data fields of the member profile or different strengths or types of relationships between the data fields, as discussed below with respect to FIG. 6. The <job_title_code> and <employer_code> elements of the search entry field may be identified based on natural language parsing of the member profile and mapping of the parsed elements to predefined codes corresponding to the job title and employer. Thus, regardless of how the job title or name of the employer is specified in the member profile (e.g., as abbreviations, nicknames, and an on), it may be translated and mapped to a universal job title code or employer code. Alternatively, separate index entries may be generated for each possible variation of the job title or name of the employer. As an example, a software engineer at Apple may be stored as "apple:software apple:engineer."

At operation 408, the search index module 34 provides the search index entry for use by the search engine in ranking the member profile. For example, the search index module 34 adds the search index entry to an inverted search index that is stored and then accessed by the search engine during the ranking process described above with respect to FIG. 3.

Figure 5:
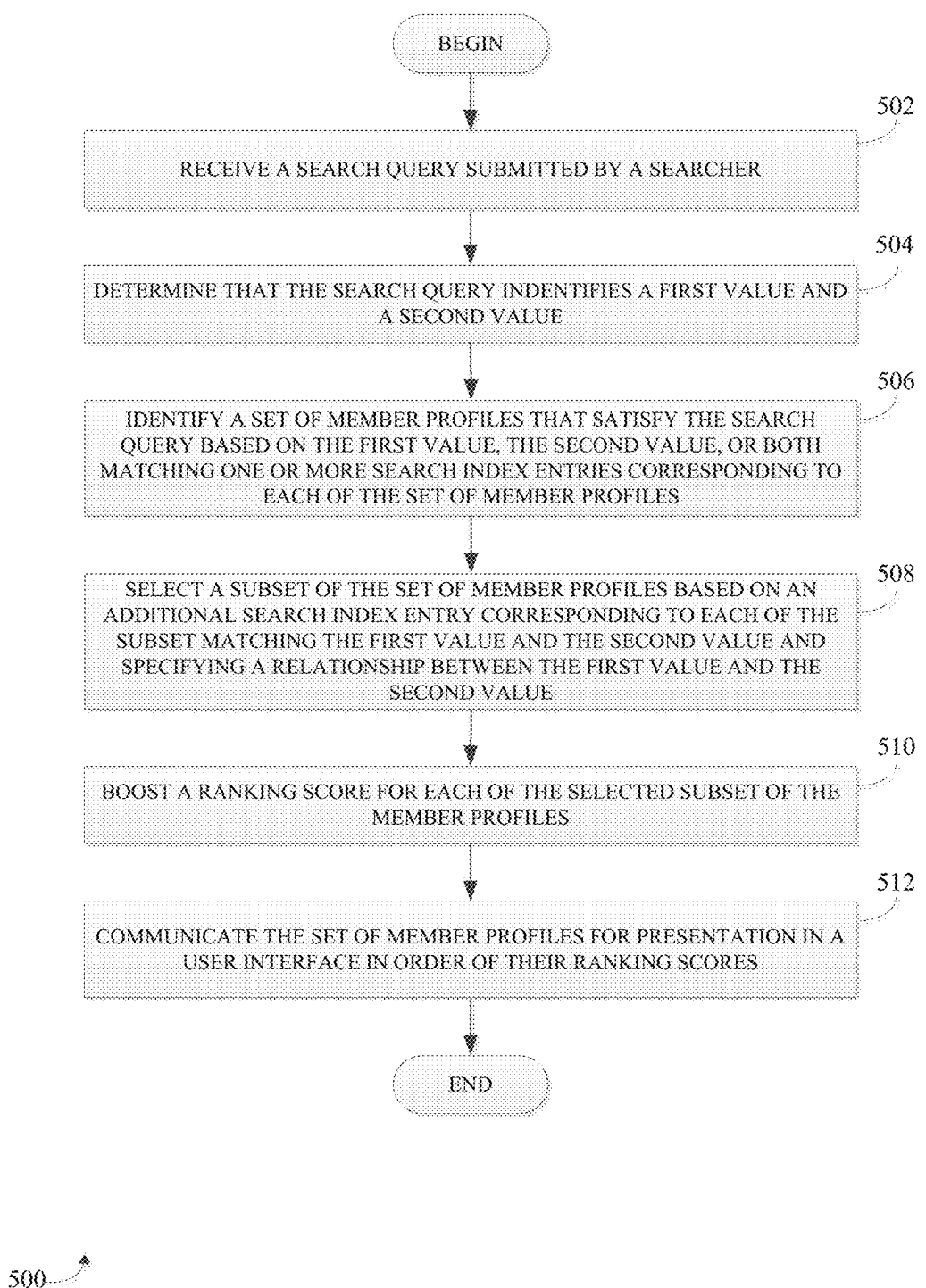
FIG. 5 is a flow diagram illustrating an example method of boosting ranking scores for member profiles based on various criteria.

FIG. 5 is a flow diagram illustrating an example method 500 of boosting ranking scores for member profiles based on various criteria. In various embodiments, the method 500 is implemented by one or more of the modules of FIG. 2. At operation 502, the query processing module 24 receives a search query submitted by a searcher.

At operation 504, the query processing module 24 determines that the search query identifies a first value and a second value. For example, the query processing module determines that the search query specifies a job title, an employer, a location, a job function, an educational achievement (e.g., a degree obtained), an award, or any two values corresponding to any two data fields associated with a corpus of member profiles maintained with respect to a social networking system. For example, as discussed above with respect to FIG. 3, the query processing module 24 compares combinations of keywords and keyword phrases to lists of known job titles and names of employers to determine whether the keywords correspond to job titles or names of employers. In various embodiments, the query processing module 24 also performs a translation of the keywords and keyword phrases. In this way, abbreviations, nicknames, shortcuts, codes, or other information identifying values corresponding to the data fields of the member profiles may be identified and mapped to universal codes. In various embodiments, the mappings of the values specified in the search query to known values corresponding to the data fields may be determined through the discovery process discussed with respect to FIG. 2 in which the historical search data 30 is analyzed.

At operation 506, the query processing module 24 identifies a set of member profiles that satisfy the search query. For example, the query processing module 24 compares keywords specified in the search query with keywords specified an inverted search index. Based on a matching of one or more keywords specified in the query to keywords in the inverted search index, the query processing module 24 identifies a set of member profiles that satisfy the search query.

At operation 508, the query processing module 24 selects a subset of the set of member profiles for boosting in the rankings of the set of member profiles. For example, the query processing module 24 identifies a context of the search based on, for example, information specified in a profile of the searcher (e.g., whether the searcher is a job seeker, recruiter, or salesperson), information pertaining to a reason why the searcher is performing the search (e.g., whether the searcher is trying to identify members the searcher may know, identify connections of the searcher who may be able to introduce the searcher to another member, identify potential candidates for a job opening, identify contacts within an organization who can serve as sales contacts for the searcher, and so on). The identification of the context may be based on behavior of the searcher, other searchers having member profiles that are similar to the searcher, or connections of the searcher (e.g., as derived from the profile data 16, social graph data 18, and member activity and behaviour data 20). The identification of the context may also be based on analysis of the historical search data 30, as described above with respect to FIG. 2.

Based on the context of the search, the query processing module 24 may infer relationships between combinations of keywords and keyword phrases specified in the query. For example, based on a the determination that search query includes the job title and the name of the employer and based on a determination that the searcher is a sales person seeking to identify sales contacts within an organization, the query processing module 24 may determine that the searcher is not simply trying to find member profiles having keywords that match the keywords specified in the search query, but is instead trying to find member profiles having particular values specified for particular fields of the member profile. For example, the query processing module 24 may determine that the searcher is searching for member profiles specifying a job function of a current job as being a sales function and a location of a current job being a particular geographical location. Thus, the subset of the member profiles satisfying the query may be selected based on the member profiles specifying specific values for specific data fields. The determination of whether each of the subset of the member profiles specify the particular values for the particular data fields may be based on a mapping of the translated values specified in the search query to a special search index entry that identifies member profiles having the specified values for the specified data fields. This special search index entry may be generated as described below with respect to FIG. 6.

At operation 510, the search result ranking module 26 may boost the ranking scores associated with the selected subset of the set of member profiles. Thus, for example, member profiles that specify the particular values for the particular data fields may be elevated in the rankings above member profiles that simply specify the same values as keywords in an inverted search index without any consideration of the data fields of the member profiles to which the keywords relate.

At operation 512, the set of member profiles is communicated for presentation in a user interface according to the ranking scores associated with each of the member profiles. Thus, member profiles associated with boosted ranking scores may be presented in a more prominent position in the user interface than other member profiles satisfying the search query.

Figure 6:
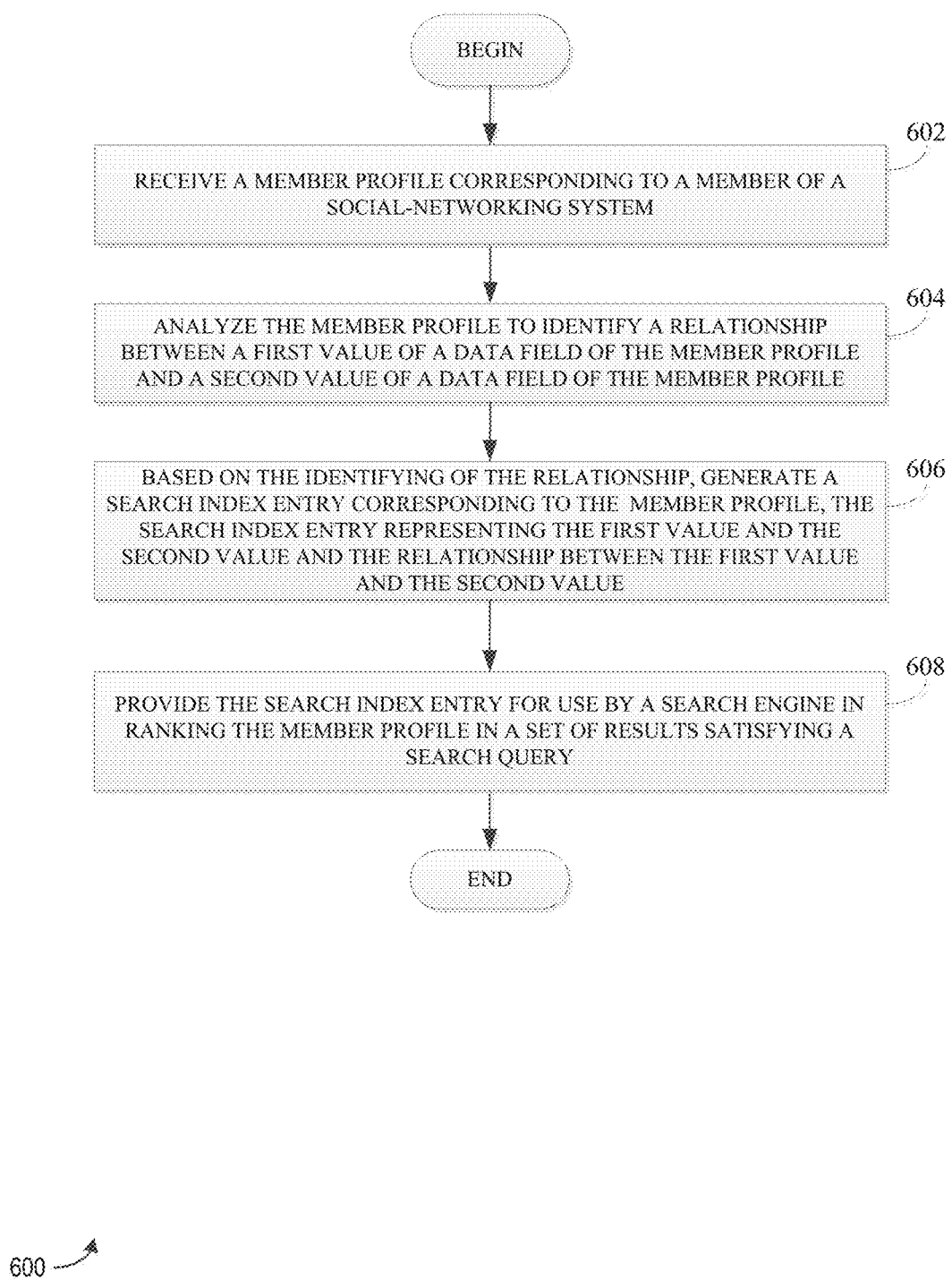
FIG. 6 is a flow diagram illustrating an example method of generating a special search index entry for a member profile that identifies a strength or a type of a relationship between values specified for data fields in the member profile.

FIG. 6 is a flow diagram illustrating an example method 600 of generating a special search index entry for a member profile that identifies a strength or a type of a relationship between values specified for data fields in the member profile. In various embodiments, the method 600 is implemented by one or more of the modules of FIG. 2. At operation 602, the profile processing module 36 receives a member profile corresponding to a member of a social-networking system. For example, the profile processing module 36 receives a submission of the member profile from the member.

At operation 604, the profile processing module 36 analyzes the member profile to determine relationships between keywords specified in the member profile. For example, the profile processing module 36 determines that a particular keyword is a job title value corresponding to a data field representing a current job title. Or the profile processing module 36 may determine that a particular keyword is a job title corresponding to one or more fields representing past job titles. Additionally, the profile processing module 36 may determine that a particular keyword is a name of an employer, geographical location, job function, or other aspect of a job specified in a work history of the member profile. Additionally, the profile processing module 36 may determine a type of a relationship or a strength of a relationship between the various identified values. Thus, for example, the profile processing module 36 may identify that values corresponding to job attributes for a current job in a work history have a stronger relationship to one another than job attributes for a past job in a work history.

At operation 606, the search index module 34 generates a special search index entry identifying at least one of the determined relationships between the identified values for data fields associated with the profile. For example, the search index module 34 may generate a special search index entry representing a relationship between a particular job title, employer, geographical location, job function, or any combination of job attributes based, for example, on a parsing of keywords specified in the work history of the profile. Thus, for example, the search index module 34 may generate a special search index entry that represents that the member profile has specified a combination of job title, employer, or geographical location as a current job or as a past job. The search index entry may have a syntax or form that is recognizable as representing values for specific data fields associated with the member profile as welt as the relationship between those fields. For example, the search index entry may be specified as "{<job_title_code>:<employer_code>:<geographical_location_code>:<job_function_code>}." In this example, the special enclosure characters (e.g., brackets) designate the portion of the search index entry included within the brackets includes special codes pertaining to the various values. Additionally, in this example, the special separator character within the search index entry (e.g., the colon) may indicate a type or a strength of relationship between the job title and employer (e.g., that the job title is specified as a current job and the employer is specified as the current employer in the associated member profile). Other special enclosure and separator characters may be used to indicate that the search index entry represents values pertaining to different data fields of the member profile or different strengths or types of relationships between the data fields, as discussed below with respect to FIG. 6. The <job_title_code> and <employer_code> elements of the search entry field may be identified based on natural language parsing of the member profile and mapping of the parsed elements to predefined codes corresponding to the job title and employer. Thus, regardless of how the job title or name of the employer is specified in the member profile (e.g., as abbreviations, nicknames, and so on), it may be translated and mapped to a universal job title code or employer code. Alternatively, separate index entries may be generated for each possible variation of the job title or name of the employer.

Additionally, the various special index entries that are generated may be based on a determination that the values and the relationships between the values have a special significance to the searcher based on an analysis of past searches, as discussed above with respect to FIG. 2. The analysis may consider a context of the search, including information known about the searcher and information known about the reason for the search. Thus, for example, the generation of a particular special search index entry that identifies particular values for particular data fields of the member profile and that identified particular relationships between those values may be based on a determination that such a special search index entry will lead to better ranking of the search results as determined from an analysis of user behaviour with respect to the search results.

At operation 608, the search index module 34 provides the search index entry for use by the search engine in ranking the member profile. For example, the search index module 34 adds the search index entry to an inverted search index that is stored and then accessed by the search engine during the ranking process described above with respect to FIG. 3. Mappings between particular keywords specified in a search query and the special search index entry may also be identified and stored in an additional search index for accessing by the search engine.

Figure 7:
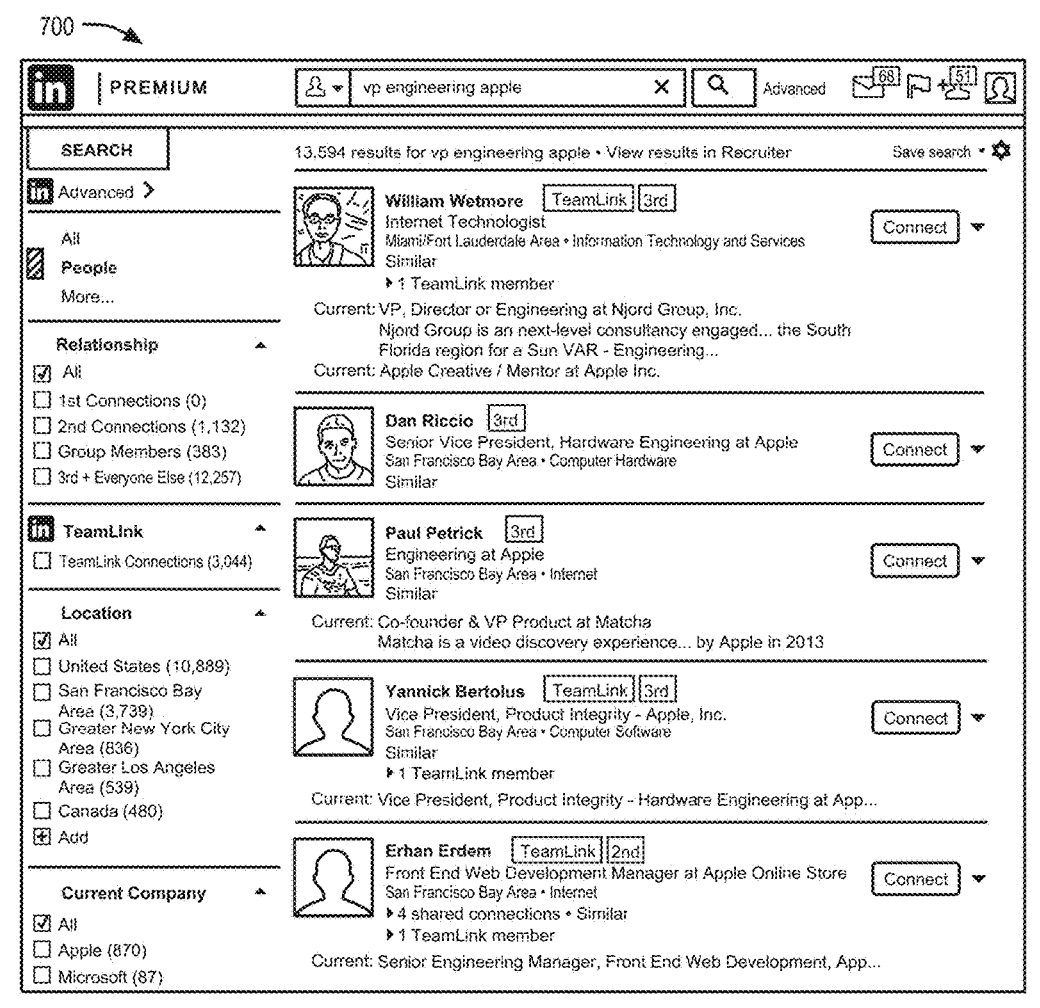

FIG. 7 is a screenshot of an example user interface 700 in which search results corresponding to a search query are presented. In this example, the keyword phrase submitted by the searcher is "vp engineering apple." This search query is processed without using any of the special index entries generated as described above with respect to FIG. 4 and FIG. 6. Thus, for example, the rankings of the search results are determined based on other data included in an inverted search index, such as keywords.

Figure 8:
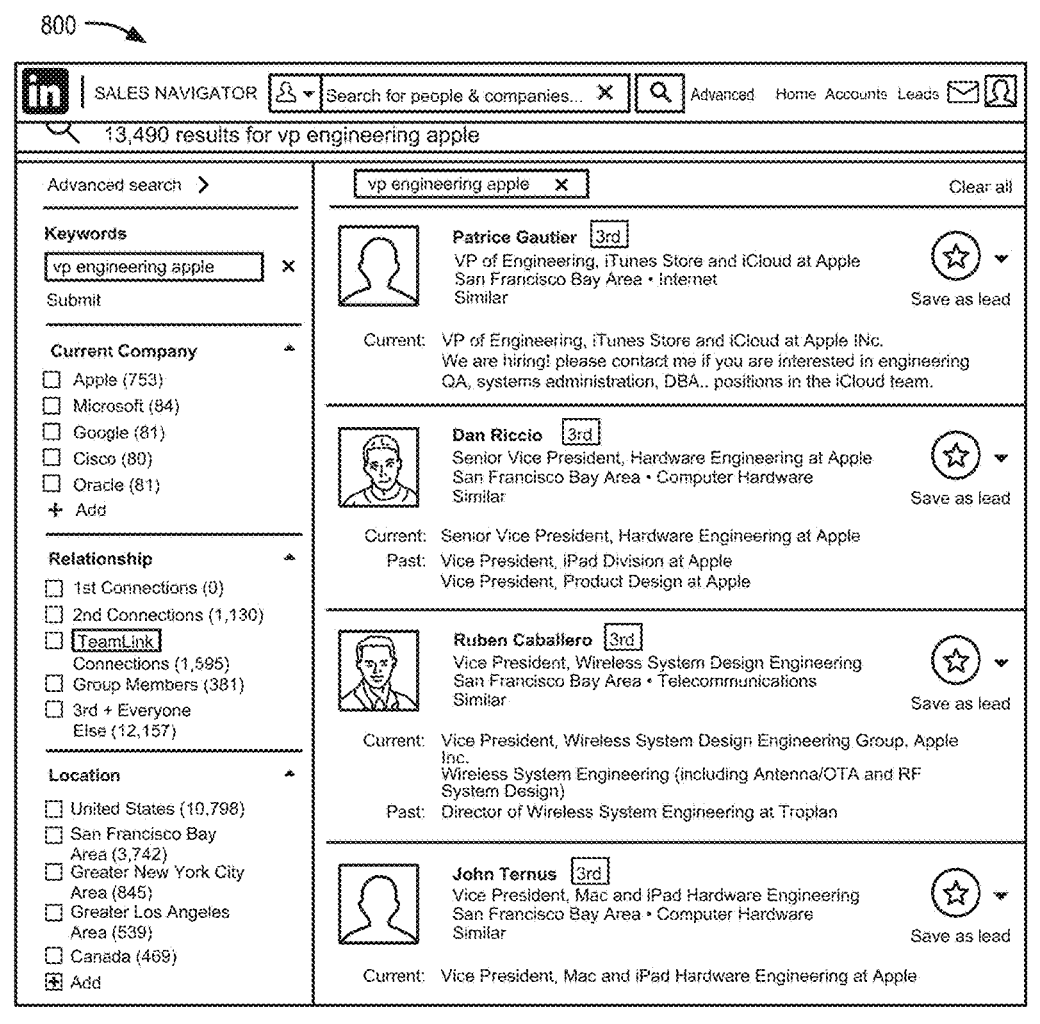

FIG. 8 is a screenshot of an example user interface 800 in which additional search results are presented. As in FIG. 7, the keyword phrase submitted by the searcher is "vp engineering apple." Unlike in FIG. 7, however, in this example, the search query is processed using special index entries. In various embodiments, the special index entries are generated in accordance with the methods described above with respect to FIG. 3 and FIG. 5. Thus, a member profiles corresponding to members who are currently serving as vice presidents of engineering at Apple have been boosted in the rankings.

Figure 9:
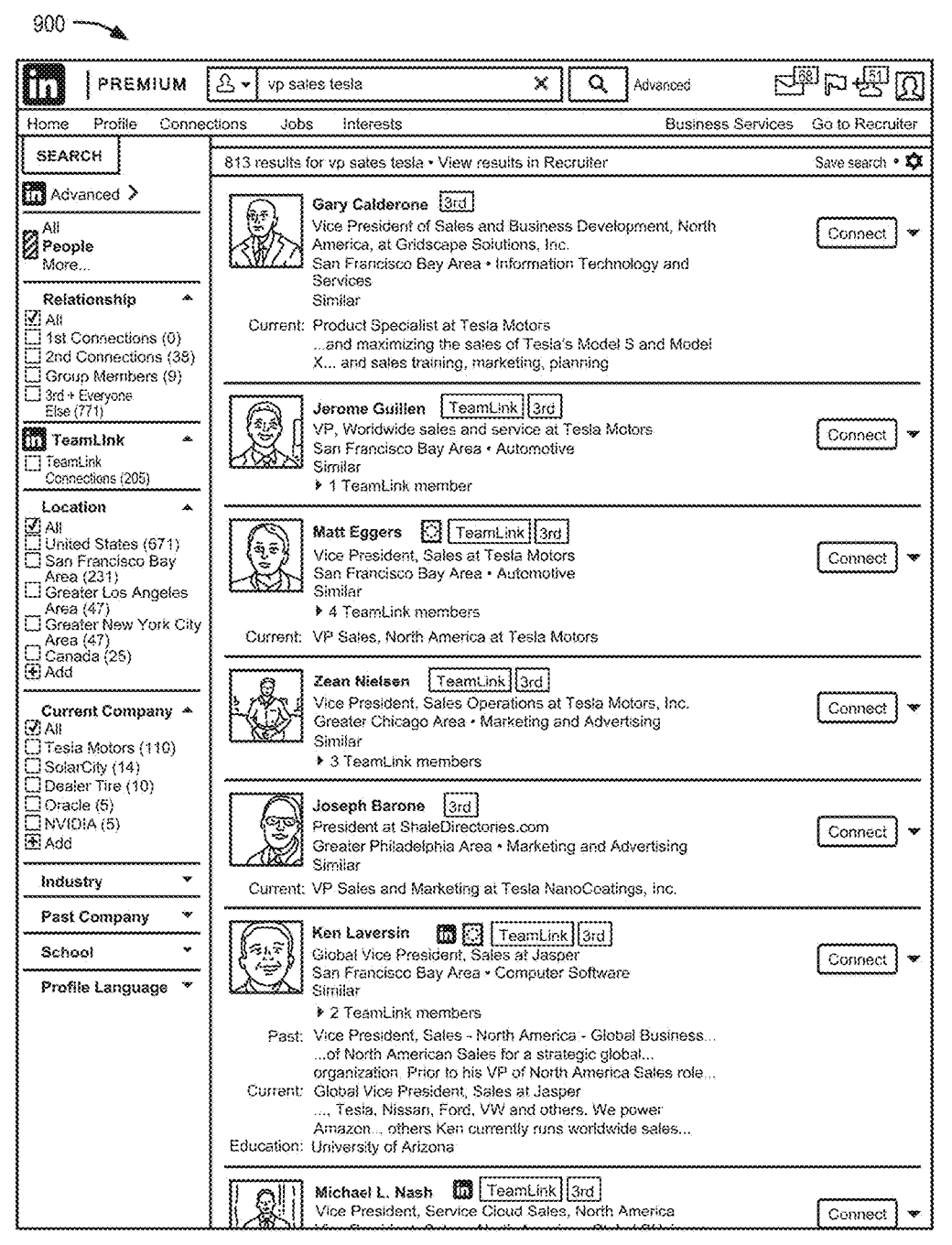

FIG. 9 is a screenshot of an example user interface 900 in which the search results of FIG. 8 have been re-ranked. In this example, the keyword phrase submitted by the searcher is "vp sales tesla." This search query is processed without using any of the special index entries generated as described above with respect to FIG. 4 and FIG. 6. Thus, for example, the rankings of the search results are determined based on other data included in an inverted search index, such as keywords.

Figure 10:
FIG. 10 is a screenshot of an example user interface in which the additional search results of FIG. 9 have been re-ranked.

FIG. 10 is a screenshot of an example user interface 1000 in which the additional search results of FIG. 9 have been re-ranked. As in FIG. 9, the keyword phrase submitted by the searcher is "vp sales tesla." Unlike in FIG. 7, however, in this example, the search query is processed using special index entries. In various embodiments, the special index entries are generated in accordance with the methods described above with respect to FIG. 3 and FIG. 5. Thus, a member profiles corresponding to members who are currently serving as vice presidents of sales at Tesla have been boosted in the rankings.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 11:
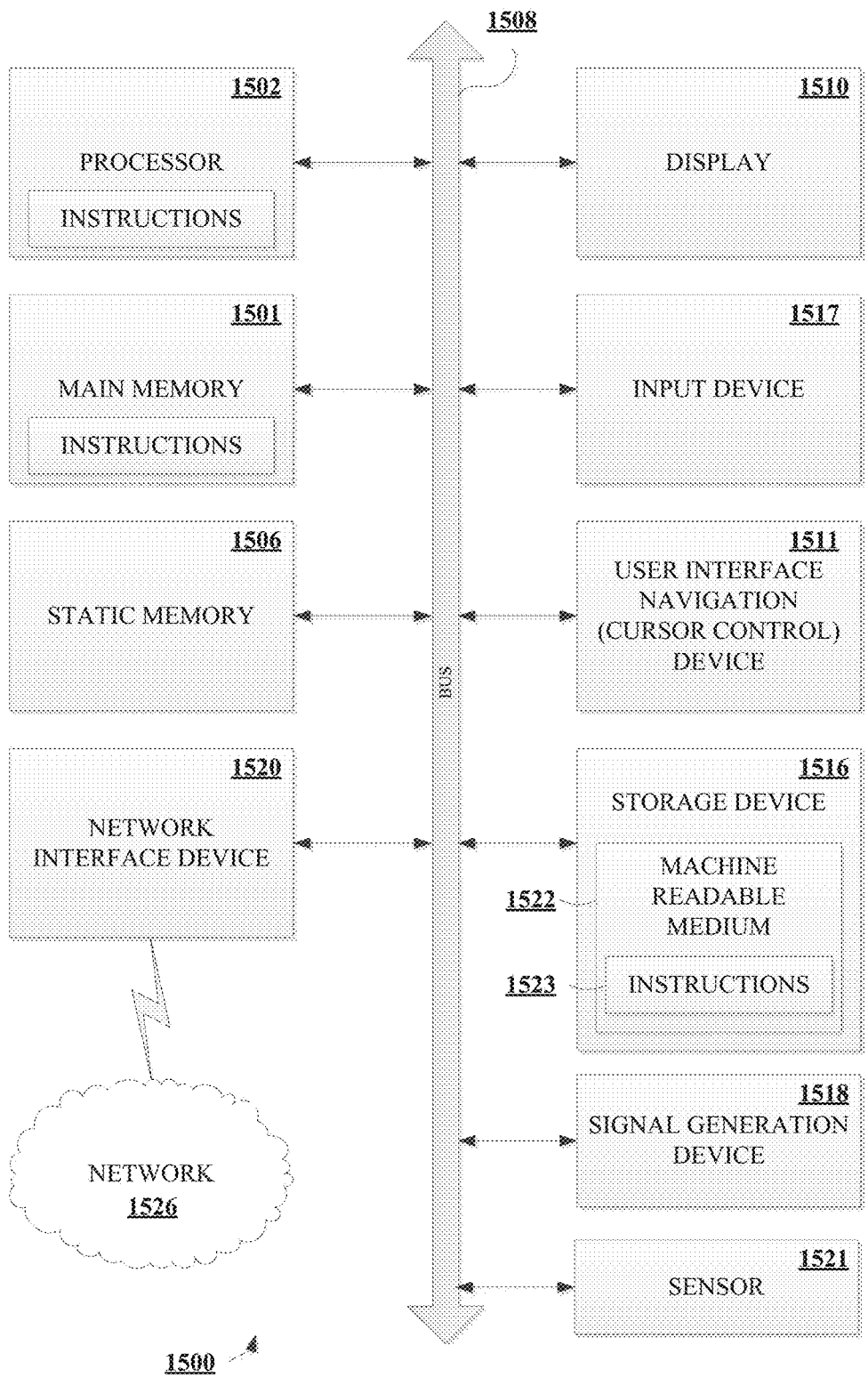
FIG. 11 is a block diagram of a machine in the form of a computing device within which a set of instructions, for causing the machine to perform any one or more of the methodologies discussed herein, may be executed.

FIG. 11 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), mobile telephone, a web appliance, network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols e.g., HTTP). Examples of communication networks include a local area network ("LAN"), a wide area network ("WAN"), the Internet, mobile telephone networks, Plain Old Telephone (POTS) networks, and wireless data networks Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
   reranking a set of member profiles for presentation in a search results user interface, the reranking comprising:
   identifying the set of member profiles, the identifying based on a set of keywords specified in a search query matching a set of search index entries corresponding to the set of member profiles;
   based on a determining that a first keyword of the set of keywords corresponds to a first value associated with a first data field included in the set of member profiles and a determining that a second keyword of the set of keywords corresponds to a second value associated with a second data field included in the set of member profiles, inferring a relationship between the first keyword and second keyword;
   based on the inferring of the relationship, comparing the combination of the first keyword and the second keyword to special index entries generated for the set of member profiles, the special index entries representing the relationship;
   selecting a subset of the member profiles, the selecting based on the comparing indicating a match between the combination and the special index entries corresponding to each of the subset of the member profiles;
   boosting ranking scores associated with each of the subset of the member profiles;
   performing the reranking of the set of member profiles, the reranking taking into account the boosted ranking scores for reach of the subset of the member profiles; and
   communicating a portion of each of the set of member profiles for presentation in the search results user interface based on the reranking.

2. The method of claim 1, wherein the determining that the first keyword of the set of keywords corresponds to the first value associated with the first data field is based on a matching of the first keyword to a plurality of possible values specified in the set of member profiles with respect to the first data field.

3. The method of claim 2, wherein the determining that the first keyword of the set of keywords corresponds to the first value associated with the first data field is based on a context of the search query, the context including information pertaining to a searcher who submitted the query and information pertaining to a behavior of the searcher who submitted the query.

4. The method of claim 3, further comprising generating the special index entries based on a determination of a significance of the values of the data fields to the context, the determination of the significance based on an analysis of a history of previous search results.

5. The method of claim 1, wherein each of the special search index entries includes a special character representing a type of a relationship between the first value and the second value.

6. The method of claim 1, wherein each of the special search index entries includes a special character representing a strength of a relationship between the first value and the second value.

7. The method of claim 5, wherein the boosting of the ranking scores is proportional to an importance of the type of the relationship, the importance determined based on an analysis of a history of past search results.

8. A system comprising:
   one or more computer processors;
   one or more computer memories;
   one or more modules incorporated into the one or more computer memories, the one or more modules configuring the one or more computer processors to perform operations for reranking a set of member profiles for presentation in a search results user interface the operations comprising:
   identifying a set of member profiles, the identifying based on a set of keywords specified in a search query matching search index entries corresponding to the set of member profiles;
   based on a determining that a first keyword of the set of keywords corresponds to a first value associated with a first data field included in the set of member profiles and a determining that a second keyword of the set of keywords corresponds to a second value associated with a second data field included in the set of member profiles, inferring a relationship between the first keyword and second keyword;
   based on the inferring of the relationship, comparing the comparing the combination of the first keyword and the second keyword to special index entries generated for the set of member profiles, the special index entries representing the relationship;
   selecting a subset of the member profiles, the selecting based on the comparing indicating a match between the combination and the special index entries corresponding-to each of the subset of the member profiles;
   boosting ranking scores associated with each of the subset of the member profiles;
   performing the reranking of the set of member profiles, the reranking taking into account the boosted ranking scores for reach of the subset of the member profiles; and communicating a portion of each of the set of member profiles for presentation in the search results user interface based on the reranking.

9. The system of claim 8, wherein the determining that the first keyword of the set of keywords corresponds to the first value associated with the first data field is based on a matching of the first keyword to a plurality of possible values specified in the set of member profiles with respect to the first data field.

10. The system of claim 9, wherein the determining that the first keyword of the set of keywords corresponds to the first value associated with the first data field is based on a context of the search query, the context including information pertaining to a searcher who submitted the query and information pertaining to a behavior of the searcher who submitted the query.

11. The system of claim 10, further comprising generating the special index entries based on a determination of a significance of the values of the data fields to the context, the determination of the significance based on an analysis of a history of previous search results.

12. The system of claim 8, wherein each of the special search index entries includes a special character representing a type of a relationship between the first value and the second value.

13. The system of claim 8, wherein each of the special search index entries includes a special character representing a strength of a relationship between the first value and the second value.

14. The system of claim 12, wherein the boosting of the ranking scores is proportional to an importance of the type of the relationship, the importance determined based on an analysis of a history of past search results.

15. A non-transitory computer-readable storage medium storing instructions thereon, which, when executed by one or more processors, cause the one or more processors to perform operations, the operations comprising:
reranking a set of member profiles for presentation in a search results user interface, the reranking comprising:
identifying the set of member profiles, the identifying based on a set of keywords specified in a search query matching a set of search index entries corresponding to the set of member profiles;
based on a determining that a first keyword of the set of keywords corresponds to a first value associated with a first data field included in the set of member profiles and a determining that a second keyword of the set of keywords corresponds to a second value associated with a second data field included in the set of member profiles, inferring a relationship between the first keyword and second keyword;
based on the inferring of the relationship, comparing the comparing the combination of the first keyword and the second keyword to special index entries generated for the set of member profiles, the special index entries representing the relationship;
selecting a subset of the member profiles, the selecting based on the comparing indicating a match between the combination and the special index entries for each of the subset of the member profiles;
boosting ranking scores associated with each of the subset of the member profiles;
performing the reranking of the set of member profiles, the reranking taking into account the boosted ranking scores for reach of the subset of the member profiles; and
communicating a portion of each of the set of member profiles for presentation in the search results user interface based on the reranking.

16. The non-transitory computer-readable storage medium of claim 15, wherein the determining that the first keyword of the set of keywords corresponds to the first value associated with the first data field is based on a matching of the first keyword to a plurality of possible values specified in the set of member profiles with respect to the first data field.

17. The non-transitory computer-readable storage medium of claim 16, wherein the determining that the first keyword of the set of keywords corresponds to the first value associated with the first data field is based on a context of the search query, the context including information pertaining to a searcher who submitted the query and information pertaining to a behavior of the searcher who submitted the query.

18. The non-transitory computer-readable storage medium of claim 17, further comprising generating the special index entries based on a determination of a significance of the values of the data fields to the context, the determination of the significance based on an analysis of a history of previous search results.

19. The non-transitory computer-readable storage medium of claim 15, wherein each of the special search index entries includes a special character representing a type of a relationship between the first value and the second value.

20. The non-transitory computer-readable storage medium of claim 15, wherein each of the special search index entries includes a special character representing a strength of a relationship between the first value and the second value.

* * * * *

UNITED STATES PATENT AND TRADEMARK OFFICE
CERTIFICATE OF CORRECTION

PATENT NO. : 10,042,940 B2
APPLICATION NO. : 14/579772
DATED : August 7, 2018
INVENTOR(S) : Agarwal et al.

Page 1 of 1

It is certified that error appears in the above-identified patent and that said Letters Patent is hereby corrected as shown below:

In the Claims

In Column 20, Line 38, in Claim 8, after "interface", insert --,--

In Column 20, Line 53, in Claim 8, before "combination", delete "comparing the"

In Column 20, Lines 59-60, in Claim 8, delete "corresponding-to" and insert --corresponding to-- therefor In Column 22, Line 2, in Claim 15, before "combination", delete "comparing the"

Signed and Sealed this
Twenty-fifth Day of June, 2019

Andrei Iancu
*Director of the United States Patent and Trademark Office*